United States Patent [19]

Culkin

[11] Patent Number: 5,014,564
[45] Date of Patent: May 14, 1991

[54] ECCENTRIC DRIVE MECHANISM

[75] Inventor: Joseph B. Culkin, Emeryville, Calif.

[73] Assignee: Calvest Associates, Las Vegas, Nev.

[21] Appl. No.: 500,061

[22] Filed: Mar. 27, 1990

[51] Int. Cl.[5] .............................................. B06B 1/16
[52] U.S. Cl. ........................................... 74/61; 74/87
[58] Field of Search ................... 74/61, 87; 366/128, 366/114; 51/163.2

[56] References Cited

U.S. PATENT DOCUMENTS

| | | | |
|---|---|---|---|
| 4,253,962 | 3/1981 | Thompson | 210/414 |
| 4,266,434 | 5/1981 | Burns | 74/61 |
| 4,461,122 | 7/1984 | Balz | 74/87 X |
| 4,859,070 | 8/1989 | Musschoot | 74/87 X |

Primary Examiner—Richard E. Moore
Attorney, Agent, or Firm—Bielen, Peterson & Lampe

[57] ABSTRACT

A drive mechanism for a body utilizing a motor which rotates a shaft. An eccentric weight is mounted on the shaft for movement with the same. The eccentric weight is linked to a base weight and transmits an oscillational motion along a dimension of the base weight. A torsion spring fixed to the counter weight extends away from the base weight and connects to the body to impart an oscillational torsional motion thereto.

21 Claims, 3 Drawing Sheets

ECCENTRIC DRIVE MECHANISM

BACKGROUND OF THE INVENTION

The present invention relates to a novel drive mechanism for a body.

Many mass and heat transport systems require establishment of a vibratory oscillational motion on a weighted body. For example, such vibrational displacement may be employed in a plate and frame heat exchanger, a solid liquid mixer, a momentum pump, a gas absorber, and like devices.

Reference is made to my co-pending patent application, Ser. No. 321,797 which describes a device and method for filtering colloidal suspensions employing membranes which are vibrated tangentially to the flow of filtered colloidal materials.

Vibrations have been created using ultrasonic transducers such as those found in U.S. Pat. No. 4,253,962. In fact, it is known that a linear motor can induce back and forth linear oscillations in a body. In general, vibrators or force transducers which produce oscillatory motion on bodies are normally of at least two types; mechanical engines and spring-mass resonators. In the mechanical engine, oscillational motion is produced by an arm attached by a bearing to the rim of a fly wheel. As the fly wheel rotates, the arm oscillates back and forth linearly or orbitally depending on the length and articulation of the tie rod between the load and the crank arm. Reciprocating action thus produced can be used to produce proportional oscillational movement by connecting the arm to a turntable through a bearing. Mechanical engines are generally cumbersome and difficult to control at high frequencies.

The spring-mass resonator utilizes a body to be vibrated which is connected to a spring having a size and thickness which is chosen to create a mechanical resonator with the desired resonant frequency and safe deflection amplitude. For example, a linear mechanical resonator would consist of a compression spring attached to a mass. On the other hand, a torsional mechanical resonator would consist of a mass connected to another, usually larger mass by way of a torsion spring. The larger mass would receive mechanical energy applied by a force transducer. It should be noted that other vibration mechanisms such as pneumatic vibrators are known in the art. Unfortunately, the creation of precision spring-mass resonators has proven difficult.

A drive mechanism for a body which induces oscillational motion therein with great accuracy and control would be a notable advance in the field of heat and mass transport.

SUMMARY OF THE INVENTION

In accordance with the present invention a novel and useful drive mechanism for a body is herein provided.

The drive mechanism of the present invention is applied to a body which is constructed of a predetermined weight is positioned above a supporting surface. Motor means is included in the present invention for rotating an output shaft. The motor means may be typically an AC motor having a motor control which may vary the rotational speed of the output shaft of the motor. The output shaft may be constructed in three portions, portion directly connected to the motor means, a second shaft portion separated from the first shaft portion, and an intermediate shaft portion. A pair of flexible couplings may be connected to the first and second shaft portions and further include the intermediate shaft portion between the flexible couplings. An eccentric weight connects the rotating output shaft to the motor means, specifically at the second shaft portion, thereof. The eccentric weight would turn with the output shaft of the motor means.

The present invention also possesses as one of its elements a base weight having a predetermined mass which is normally less than the predetermined mass or weight of the body being driven by the mechanism of the present invention. The base weight is connected to the second shaft portion and subject to the forces generated by the eccentric weight connected thereto. In essence, the eccentric weight induces a wobble which is transmitted to the base weight which then itself begins to move in an oscillational manner. Thus, the base weight becomes a seismic mass possessing a certain vibration. The base weight or seismic mass is supported above the surface by isolation means in the form of at least one deformable foot. Such deformable foot may also be composed of an elastomeric or resilient material. Such isolation means frees the base weight from the supporting surface for permitting movement of the base weight in the seismic mass mode relative to the supporting surface. The oscillational motion of the base weight may be produced along a dimension of the base weight, and, in particular, could be a torsional motion about an intersecting axis of the base weight. In such a case, the connected rotating eccentric weight would bear on the base weight apart from the axis of the oscillational torsional motion of the base weight.

A spring element, such as a torsion spring, is fixed to and extends from the base weight or seismic mass. Such fixing may take place along the axis of the torsional motion with the base weight heretofore described. The torsion spring may take the form of a relatively uniform rod having an enlargement thereupon adjacent the fixation place of the torsion spring to the base weight. Of course, such torsion spring would possess a natural frequency and be capable of resonating with the original vibratory motion transmitted from the base weight. Such torsion spring would also be located above the supporting surface and extend outwardly from the base weight. The body being driven by the present mechanism may be connected to the end of the torsion spring. It should be noted that oscillational torsional motion is also produced on the body, but 180° out of phase from the complimentary motion of the base weight or seismic mass. In essence, a shear force is created on the surface of the body which may be employed in various energy and mass transport systems.

It may be apparent that a novel and useful drive mechanism for a body has been described.

It is therefore an object of the present invention to provide a drive mechanism for a body which is capable of inducing a vibrational force on the body of very high magnitude utilizing relatively simple motor means.

Another object of the present invention is to provide a drive mechanism for a body which works at or near a resonant frequency of the elements of the drive mechanism without fixing of the mechanism to a rigid surface.

Another object of the present invention is to provide a drive mechanism for a body which utilizes a torsion spring that possesses a very long life span and is operated at or near resonant frequency.

A further object of the present invention is to provide a drive mechanism for a body which produces an oscillational torsional motion on the body and may be employed with conduits used for separation of fluid and solid components.

Yet another object of the present invention is to provide a drive mechanism for a body which produces an oscillational or vibratory force on the body and is easily controlled for use in various energy and mass transport systems.

Another object of the present invention is to provide a drive mechanism for a body which possesses a very high efficiency in translating a rotational mechanical motion to an oscillational torsional motion on the body.

The invention possesses other objects advantages especially as concerns particular characteristics and features thereof which will become apparent as the specification continues.

BRIEF DESCRIPTION OF THE DRAWINGS

FIG. 3 is top plan view showing certain elements of the present invention in schematic format.

For a better understanding of the invention reference is made to the following detailed description of the preferred embodiments thereof which should be taken in conjunction with the heretofore described drawings.

DESCRIPTION OF THE PREFERRED EMBODIMENTS

Various aspects of the present invention will evolve from the following detailed description of the preferred embodiments which should be referenced to the prior described drawings.

Figure 1:
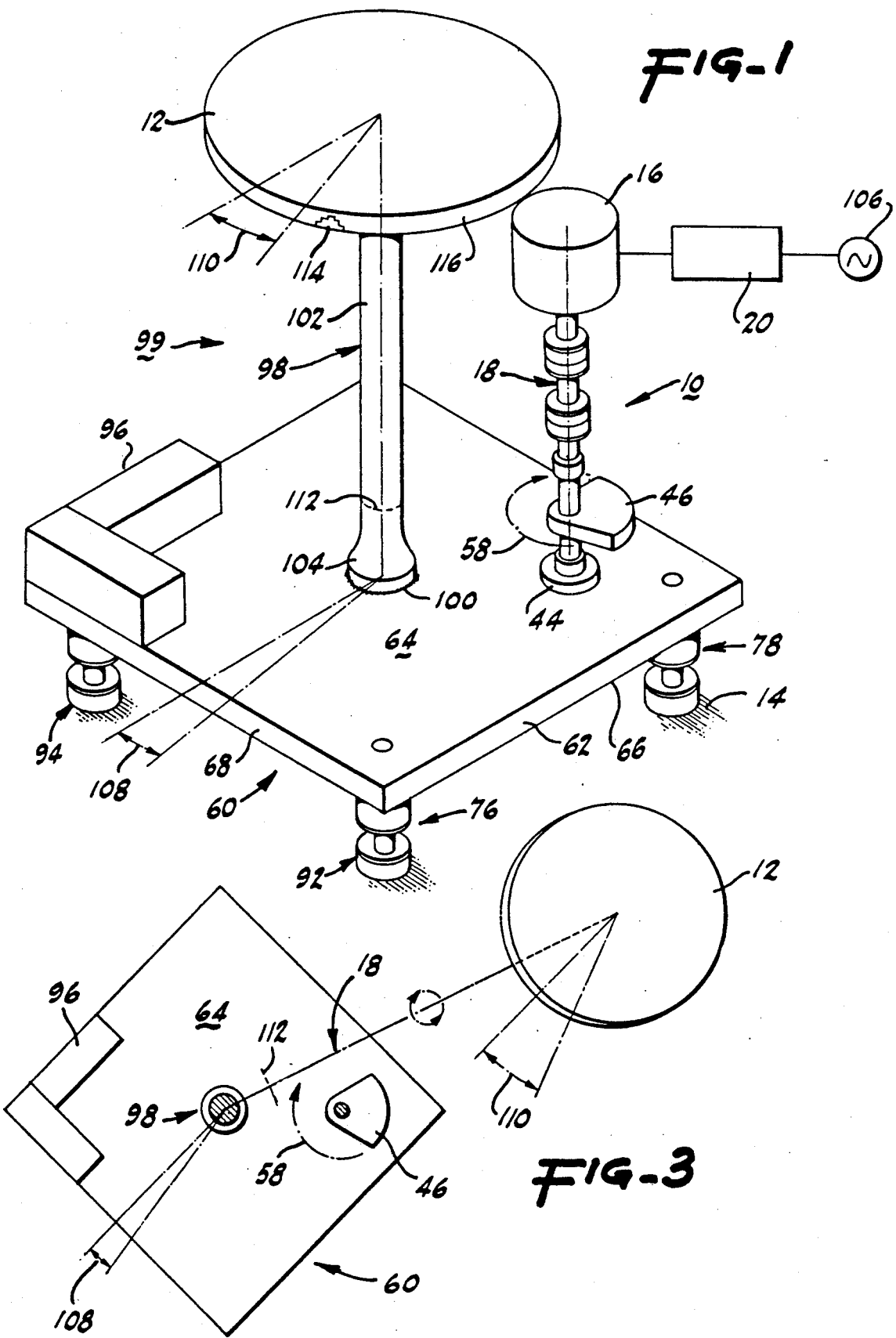
FIG. 1 is a top, right perspective view depicting the basic elements of the present invention in schematic format.

The invention as a whole is depicted in the drawings, FIG. 1, by reference character 10. The drive mechanism 10 is intended for use with a weighted body 12 which is depicted in the form of a disk which may be layered. The body 12 is positioned above a supporting surface 14 which permits the access to body 12 by the user of mechanism 10. Body 12 possesses a predetermined weight or mass which interacts with the other components of the system to be described hereinafter.

Motor means 16 is also depicted in the drawings as an electrical AC motor driven by normally available line power. For example, a ¾ horsepower AC motor manufactured by Baldor Electric Co., Fort Smith, Ark. suffices in this regard. Motor means 16 possesses an output shaft whose speed is controlled by motor control 20, FIG. 1. For example a motor control model no. AFC200.7C2 manufactured by T. B. Woods Sons Co., Chambersburg, Pa. very accurately determines the speed in rpms of shaft 18.

Figure 2:
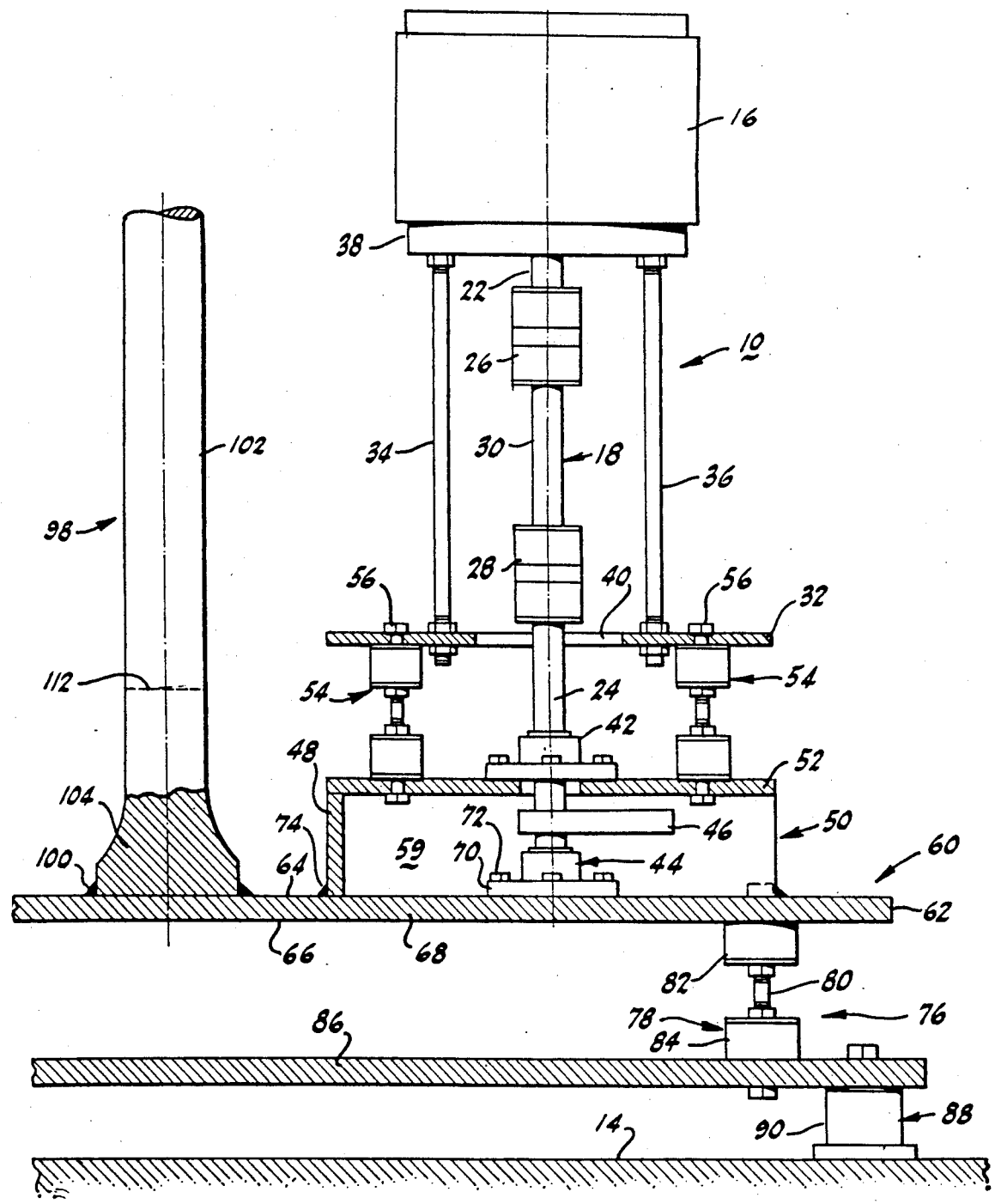
FIG. 2 is a partial sectional view of the present invention showing the driving and support mechanisms of the present invention.

With reference to FIG. 2, it should be seen that shaft 18 includes a first shaft portion 22 and a second shaft portion 24. First shaft portion 22 links directly to motor means 16. Flexible couplings 26 and 28, as well as intermediate shaft portion 30 effect the connection between shaft portion 22 and shaft portion 24. Flexible couplings 26 and 28 may be of the type Lo 70 and Lo 95 manufactured by the Lovejoy Co. of Downers Grove, Ill. Motor means 16 is fastened to plate 32 by pairs of bolts 34 and 36 which attach to motor plate 38. Second shaft portion 24 extends through opening 40 of plate 32, through bearing 42, and terminates in bearing 44.

Eccentric weight 46, depicted as being pie-shaped, is fixed to shaft portion 24 and lies within a housing 48 which also encloses bearing 44. Housing 48 and eccentric weight may be referred to as drive box 50. Housing 48 includes an upper roof 52. Plate 32 is mounted above roof 52 by the use of plurality of elastomeric mechanical insulators 54 (two shown in FIG. 2) which are held to plate 32 and roof 52 by plurality of bolts 56. Thus, eccentric weight 46 rotates according to directional arrow 58, FIG. 1, within chamber 59 of housing 48. Eccentric weight 46 may be welded to shaft 24 or affixed thereto in any other suitable manner.

The present invention also is provided with a base weight or seismic mass 60 in the form of a rectangular plate 62 having a top surface 64 and an under surface 66 separated by edge portion 68. Bearing 44 and, thus, eccentric weight 46 are preferably mechanically linked to plate 62 via flange 70 and fastening means 72 in the form of a multiplicity of machines screws. Housing 48 is welded to the upper surface 64 of plate 62 along weld line 74, FIG. 2.

To permit the vibrational motion of plate 62, means 76 is depicted in the drawings for mounting base weight or seismic mass 60 to surface 14. Means 76 externalizes in at least one tractable foot, such as foot 78, FIG. 2, which is linked to seismic mass 60 by fastening means 80. Exemplar foot 78 includes a pair of cylindrical elastomeric members 82 and 84. Each pair of tractable feet of means 76 (one not shown in FIG. 1) rests on a metallic skid such as skid 86 depicted in FIG. 2. Each skid, such as skid 86, includes a pair of isolation members illustrated by isolation member 88, FIG. 2, which rest on surface 14. Isolation member 88 includes an elastomeric body 90. In other words, tractable feet 78 and 92, FIG. 1, rests on skid 86 having a pair of isolation members such as isolation member 88. Likewise, tractable foot 94 and another (not shown) rest on another skid having a pair of isolation member similar to skid 86 and isolation member 88. A balancing or counter weight 96 also lies atop surface 64 of plate 62 in order to distribute the load exerted on plate 62 from such items as motor means 16, shaft 18, eccentric weight 46 and the like.

Spring element in the form of a torsion spring 98 is fixed to seismic mass 60 by welding the same to upper surface 64 of plate 62 along weld bead 100. Torsion spring 98, in the embodiment depicted in the drawings, is constructed of a rod 102 which may be 2.3 inches in diameter and approximately 50″ high. Rod 102 includes an enlargement 104 which reinforces the end of torsion spring 98 at the fixation of the same to seismic mass 60. Torsion spring 98 may be formed of a 4130 steel alloy which is hardened to Rockwell 45. In this regard, seismic mass may be approximately 20″×20″ and 1″ thick, weighing approximately 120 pounds and formed of steel. Moreover, eccentric weigh 46 may only weight ¼ to ½ pound.

Body 12 also connects to torsion spring 98. Body 12 may be a disk, FIG. 3, approximately 13″ in diameter and 1 to 2″ in thickness. In addition, the body 12 may be formed of steel and weigh about 50 pounds. Base weight 60, spring element 98, and body 12 form a spring-mass unit 99. As heretofore discussed, body 12 may include components which permit any type of energy or mass transport operation.

In operation, motor means 16 is activated from an AC power source 106 and regulated by motor controller 20. For example, at an exciting frequency level of 60 hertz, shaft 18 will turn at approximately 3600 rpms. Eccentric weight 46 rotates according to directional arrow 58 and produces an oscillational motion or vibration on seismic mass 60 along directional arrow 108. This vibrational energy is transmitted to torsion spring 98 which induces an oscillational torsional motion to body 12 along directional arrow 110. For the system depicted in the drawings, body 12 moves at an amplitude of 5 to 10 degrees and a frequency of approximately 60 hertz. As body 12 is lighter (having less moment of inertia) than seismic mass 60 the amplitude of vibration of body 12, directional arrow 110, is larger than the vibration of seismic mass 60, directional arrow 108. Body 12 vibrates 180 degrees out of phase from plate 160; consequently, there is a node 112 at about 5 to 8 inches above the surface 64 of plate 62. As torsion spring 98 possesses a natural frequency, a certain motor speed of rotating output shaft 68 and eccentric weight 46 a induces a vibrational frequency in seismic mass 60 which approaches the resonant frequency of torsion spring 98. At resonant frequency, body 12 vibrates along directional arrow 110 at a maximum amplitude. Further increases in the speed of motor means 16 will only decrease such amplitude. However, it has been found that system 10 is best run below the maximum amplitude of body 12 to reduce stress on torsion spring 98 and, thus, insure a prolonged torsion spring life. Mounting means 60 permits the free movement of mass 60 in the operation of mechanism 10. FIG. 3 depicts, schematically, various movements of the critical elements of mechanism 10.

Figure 4:
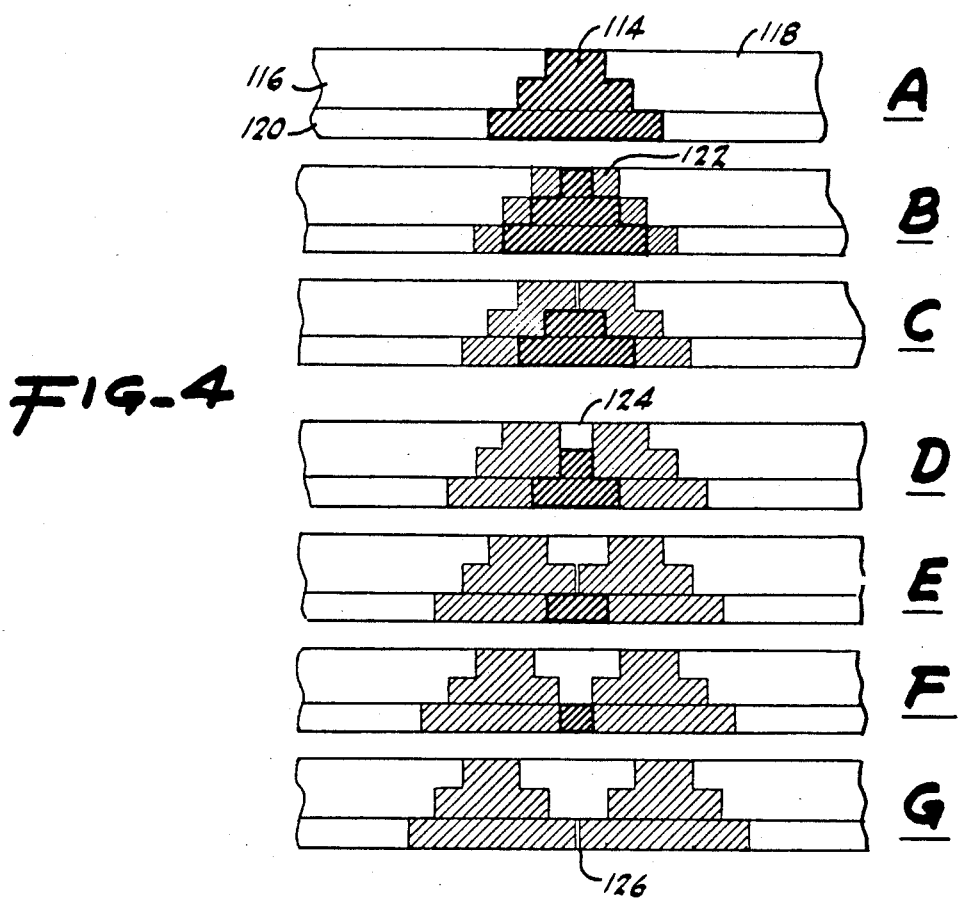
FIG. 4 is a series of progressive views depicting visual indications as to the amplitude of the body being driven by the mechanism of the present invention.

Since the AC frequency of the power fed into motor means 16 is important, indicia 114 has been imprinted on edge portion 116 of body 12 to measure the amplitude along directional arrow 110. With reference to FIG. 4, it may be observed that edge portion 116 is shown as being composed of at least two layers 118 and 120. The following table represents the amplitude of directional arrow 110 at levels A-G depicted in FIG. 4:

| FIG. 4 LEVEL | BODY 12, IN INCHES |
| --- | --- |
| A | 0 |
| B | ⅛ |
| C | ¼ |
| D | ¾ |
| E | 1 |
| F | 1¼ |
| G | 1½ |

Level A shows indica 114 when mechanism is not operating. As the amplitude of body 12 increases toward the resonance level of torsion spring 98, a blurred portion 122 appears on the periphery of indicia 114. Further increases of amplitude to levels C and D produce a clear portion 124. Portion 124 becomes T-shaped at levels E and F. Level G represents the maximum amplitude in a typical system such that the clear line 126 depicts the point of resonance or near resonance of system 10. As heretofore stated, it is preferred that system 10 be operated below the level depicted in level G of FIG. 4 to prolong the life of mechanism 10.

Figure 5:
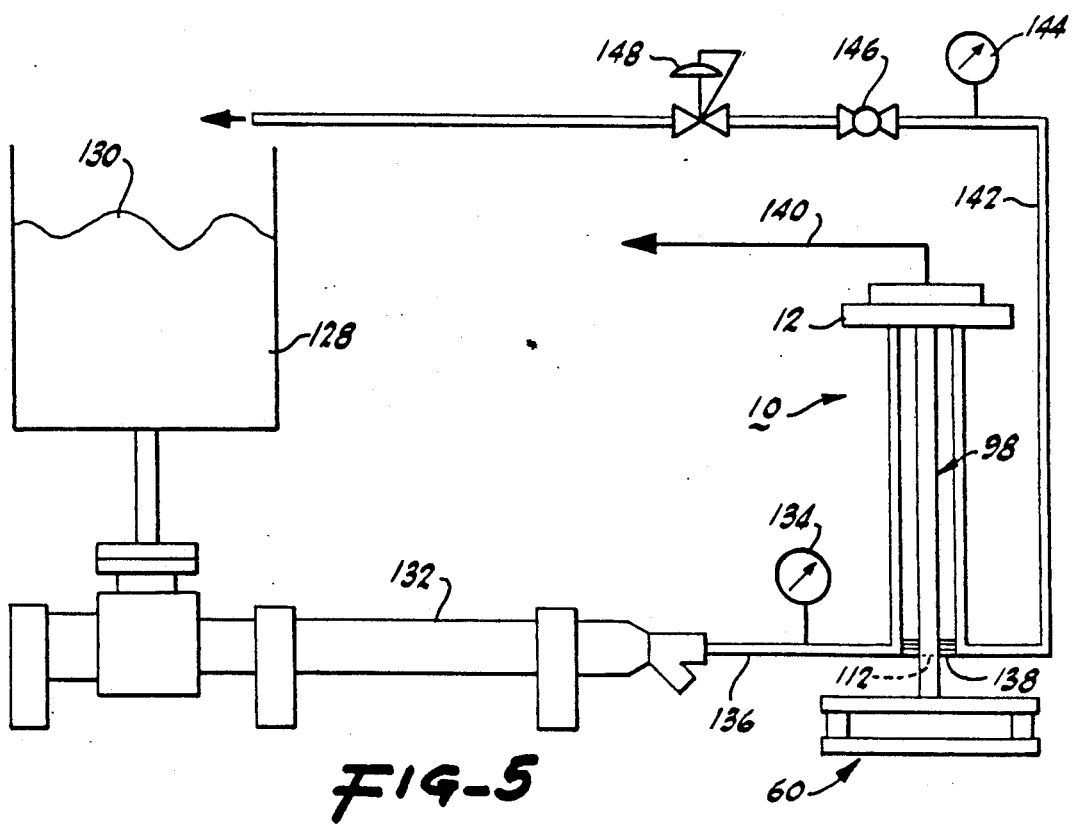
FIG. 5 is a schematic view depicting a typical use of the mechanism of the present invention in the separation of fluids and suspended solids.

Turning now to FIG. 5, it may be observed that a typical application of mechanism 10 is depicted, in which body 12 comprises a separation system for suspended particles in a fluid. Feed tank 128 containing the colloidal suspension or slurry passes stock through pump 132 monitored by pressure gage 134. Feed line 136 is clamped to torsion spring 98 by clamp 138 at node 112, previously discussed. This, of course, reduces the vibration on feed line 136 through system 10. Permeate line 140 may be either passed to waste or recycled. Concentrated slurry passes through outlet line 142 monitored by pressure gage 144 and controlled by throttling valve 146. Back pressure regulator 148 maintains the proper pressure on concentrate line 142 and, ultimately, on mechanism 10 at body 12. It should be realized, that drive mechanism 10 is capable of operation at various sheer magnitudes produced on body 12, as well as other operating parameters such as pressure.

While in the foregoing embodiments of the invention have been set forth in considerable detail for the purpose of making a complete disclosure of the invention. It may be apparent, however that numerous changes may be made in such details without departing from the spirit and principles of the invention.

What is claimed is:

1. A drive mechanism for a body possessing a predetermined weight and positioned relative a supporting surface comprising:
   a. motor means for rotating an output shaft;
   b. an eccentric weight connected to said rotating output shaft for rotation therewith;
   c. a base weight, said eccentric weight being linked to said base weight and transmitting a oscillational motion along a dimension of said base weight; and
   d. spring means for imparting oscillational motion to the body, said spring means being connected to and extending from said base weight and the body.

2. The drive mechanism of claim 1 in which said spring means comprises a torsion spring and said base weight transmits a oscillational torsional motion on said base weight.

3. The drive mechanism of claim 1 in which said output shaft rotated by said motor means further includes a first shaft portion, a second shaft portion, and flexible coupling means for connecting said first and second shaft portions, said first shaft portion being directly connected to said motor means.

4. The drive mechanism of claim 3 in which said base weight includes support means for mounting said base weight above a surface, said support means including at least one tractable foot linked to said base weight.

5. The drive mechanism of claim 2 in which said torsion spring includes a relatively uniform rod and an enlargement thereupon adjacent said fixation of said torsion spring to said base weight.

6. The drive mechanism of claim 1 in which said base weight possesses a mass larger than the body.

7. The drive of mechanism of claim 1 in which said base weight oscillational motion is a rotational motion about an axis normal to said base weight and said spring means includes an elongated member extending along said axis, said axis further intersecting the body.

8. The drive mechanism of claim 7 in which said eccentric weight, linked to said base weight bears on said base weight apart from said axis.

9. The drive mechanism of claim 8 which additionally includes a balancing weight fixed to said base weight apart from said axis.

10. The drive mechanism of claim 1 which additionally comprises means for isolating said base weight from the supporting surface.

11. The drive mechanism of claim 10 in which said means for isolating said base weight from the supporting surface includes at least one deformable foot spanning said base weight and the supporting surface.

12. The drive mechanism of claim 11 in which said deformable foot is a resilient member.

13. The drive mechanism of claim 3 in which said flexible coupling means includes first and second flexible couplings connected to said first and second shaft portions, and a third shaft portion being intermediate and connected to said first and second flexible couplings.

14. The drive mechanism of claim 13 in which said eccentric weight is fixed to said second shaft portion and lies within a housing supported on said base weight.

15. The drive mechanism of claim 1 in which said motor means is an AC motor.

16. The drive mechanism of claim 15 in which said motor means includes a means for controlling the speed of said motor means rotating output shaft.

17. The drive mechanism of claim 5 in which said torsion spring is a solid element possessing a natural frequency.

18. The drive mechanism of claim 1 which additionally comprises an indicia on the body for indicating the amplitude of oscillational motion imparted thereto by said torsion spring.

19. A drive mechanism for a body possessing a predetermined weight and positioned relative to a supporting surface, comprising:
 a. a base weight;
 b. a spring element connected to said base weight and the body to form a spring-mass unit;
 c. motor means for rotating an output shaft, said output shaft being linked to said spring-mass unit; and
 d. an eccentric weight connected to said rotating output shaft for rotation therewith, said eccentric weight transmitting an oscillational motion to said spring-mass unit to provide an oscillational motion on the body.

20. The drive mechanism of claim 19 in which said spring element includes a portion possessing a natural frequency and said oscillational motion transmitted to said spring-mass unit is capable of coinciding with said natural frequency of said spring element.

21. The drive mechanism of claim 20 in which said spring element is a torsion spring and said oscillational motion transmitted to said spring-mass unit is an oscillational torsional motion.

* * * * *